United States Patent [19]

Nara et al.

[11] Patent Number: 4,915,987

[45] Date of Patent: Apr. 10, 1990

[54] METHOD OF IMPROVING QUALITY OF SURFACE OF SOLID PARTICLES AND APPARATUS THEREOF

[75] Inventors: Yorioki Nara, Tokyo; Masumi Koishi, Sagamihara, both of Japan

[73] Assignee: Nara Machinery Co., Ltd., Tokyo, Japan

[21] Appl. No.: 183,297

[22] Filed: Apr. 11, 1988

Related U.S. Application Data

[63] Continuation of Ser. No. 903,145, Sep. 3, 1986, abandoned.

[30] Foreign Application Priority Data

| | | | |
|---|---|---|---|
| Oct. 7, 1985 | [JP] | Japan | 60-223158 |
| Dec. 13, 1985 | [JP] | Japan | 60-280272 |
| Mar. 22, 1986 | [JP] | Japan | 61-64317 |
| Apr. 23, 1986 | [JP] | Japan | 61-94172 |
| May 7, 1986 | [JP] | Japan | 61-104527 |
| Jun. 17, 1986 | [JP] | Japan | 61-140993 |

[51] Int. Cl.$^4$ ............................................. B45D 1/12
[52] U.S. Cl. ............................ 427/180; 241/189 R; 427/190; 427/195; 427/213; 427/221; 427/242; 427/222
[58] Field of Search ............... 241/189 R; 427/180, 427/190, 195, 213, 221, 222, 242

[56] References Cited

U.S. PATENT DOCUMENTS

| | | | |
|---|---|---|---|
| 3,454,263 | 7/1969 | Galle | 259/9 |
| 3,910,861 | 10/1975 | Wolvers et al. | 524/847 |
| 4,007,141 | 2/1977 | Wismer et al. | 525/107 X |
| 4,102,846 | 7/1978 | Bentley et al. | 524/356 X |
| 4,138,511 | 2/1979 | Rollas et al. | 427/195 X |
| 4,231,529 | 11/1980 | Peck et al. | 241/189 R |
| 4,331,711 | 5/1982 | Skach et al. | 427/180 |
| 4,361,290 | 11/1982 | Francis | 241/189 R X |
| 4,379,186 | 4/1983 | Bush et al. | 427/213 |
| 4,573,643 | 3/1986 | Orphall | 241/189 R |
| 4,645,131 | 2/1987 | Hailey | 241/189 R X |
| 4,774,137 | 9/1988 | Alberts et al. | 427/195 X |

FOREIGN PATENT DOCUMENTS

| | | |
|---|---|---|
| 3333733 | 3/1984 | Fed. Rep. of Germany . |
| 935537 | 6/1948 | France . |
| 228928 | 11/1969 | U.S.S.R. . |
| 319346 | 1/1972 | U.S.S.R. . |
| 321282 | 1/1972 | U.S.S.R. . |
| 559724 | 6/1977 | U.S.S.R. . |

Primary Examiner—Michael Lusignan
Attorney, Agent, or Firm—Birch, Stewart, Kolasch & Birch

[57] ABSTRACT

A method of improving the quality of the surface of solid particles is disclosed. The method includes fixing material different from the solid particles to the surface of the solid particles by the use of an impact striking device. The material fixed to the solid particles can be other solid particles or particles contained in a liquid, which forms a film.

28 Claims, 12 Drawing Sheets

FIG.I(1)
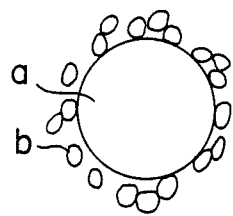
FIG.I(2)
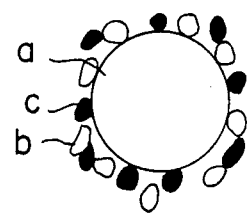
FIG.I(3)
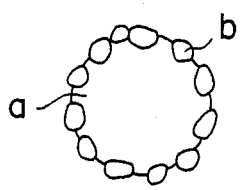
FIG.I(4)
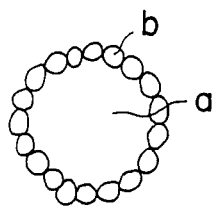
FIG.I(5)
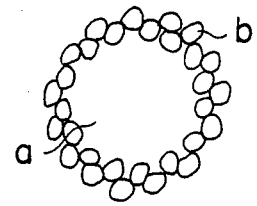
FIG.I(6)
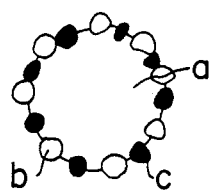
FIG.I(7)
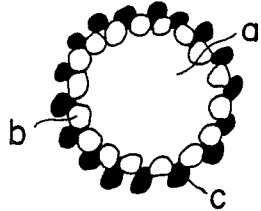
FIG.I(8)
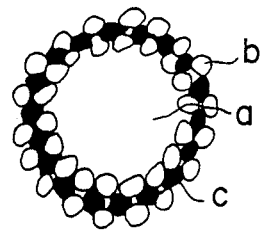

METHOD OF IMPROVING QUALITY OF SURFACE OF SOLID PARTICLES AND APPARATUS THEREOF

This application is a continuation of Ser. No. 903,145, filed Sept. 3, 1986, now abandoned.

FIELD OF THE INVENTION AND DESCRIPTION OF RELATED ART

The present invention relates to a method and an apparatus for improving the quality of the surface of solid particles forming a powder by fixing other material, for example, other solid particles or liquids on the surface of the solid particles forming cores by means of an impact striking measure.

More particularly, the present invention relates to a method and an apparatus for improving the quality of the surface of particles (hereinafter referred to as mother particles) by adhering fine particles (hereinafter referred to as child particles) on the surface of the mother particles forming cores previously or by embedding or fixing the child particles on the surface of the mother particles by an impact striking measure instead of adhering the child particles.

The present invention also relates to a method and an apparatus for improving the quality of the surface of mother particles by adhering child particles on the surface of the mother particles forming cores previously or by fixing the child particles on the surface of the mother particles by means of an impact striking measure and further softening and melting the whole or part of the child particles instead of adhering the child particles.

Further, the present invention relates to a method and an apparatus for fixing child particles formed of metal on the surface of mother particles by adhering the child particles of metal on the surface of the mother particles forming cores previously or by fixing the child particles of metal on the surface of the mother particles by means of an impact striking measure, and further beating out the whole or part of the child particles of metal by an impact striking measure instead of adhering the child particles.

The present invention relates to a method and an apparatus for improving the quality of the surface of mother particles by attaching a solution such as water containing child particles or a solution of various materials (the solutions being generalized as a liquid and when liquid is cooled and fixed on the surface of mother particles, the liquid is termed a film forming material) on the surface of the mother particles forming cores and drying or cooling the liquid to fix the child particles on the surfaces of the mother particles or to form a film of the solution on the surface of the mother particles.

The present invention relates to a method and an apparatus for improving the quality of the surface of mother particles in which other child particles are attached or implanted to the surface or cavities of the mother particles having a surface formed in various uneven shapes or with holes or grooves and an impact striking measure is employed to soften, melt, and transform projections of the mother particles to embed the child particles into the mother particles.

Heretofore, improvement of the quality of the surface of solid particles such as the prevention of lumping of solid particles, prevention of a change of the color and quality, improvement of dispersion, improvement of catalytic effects, improvement of the control of digestion and absorption, improvement of magnetic characteristics, improvement of color tone, improvement of light-resisting characteristics, improvement in regard to reduction of effective or expensive material, and the like have been made by electrochemical methods, physical absorption methods, chemical absorption methods, vacuum deposition, electrostatic adhesion methods, methods of covering with melted material, special spray-drying methods, flowing coating methods, rolling coating methods, and the like. Particularly, in the case of improving the quality of the surface of solid particles by using solid particles, that is, in the case of improving the quality of the surface of powder by using powder, and in the case of improving the quality of the surface of solid particles by using a suspension of fine particles of various materials or solutions of various materials, a well-known agitator of various mixer types or ball mill types is employed to cause agitation thereof for a long time, for example, for several hours. Electrostatic phenomenon, slow drying phenomenon and mechanochemical phenomenon caused by the agitation are utilized to improve the quality of the surface of solid particles. However, since close adhesion of the child particles or film material to the mother particles is not sufficient and the force applied to the mother particles is not even, the film is formed sparsely. Consequently, when powder which has been subjected to an improvement process is subjected to work in another process such as mixing, mixing and kneading, dispersing, pasting or the like, child particles are removed easily and segregation of components occurs so that operating conditions are not only extremely limited but also the quality of a worked product varies widely.

Further, in the improvement of the quality of the surface of solid particles in powder-powder systems, powder-suspensions and powder-solution systems by using the various types of mixers and ball mixers, the fixing force of the child particles or film forming material to the surface of the mother particles is generally weak. Accordingly, to obtain the desired quality of surfaces of solid particles takes several hours and, the apparatus therefor is large and the working efficiency is extremely low.

In addition, while various microcapsule methods have been employed when removal characteristics of material are controlled, all methods are of the wet type. However, a subsequent process requires drying and, thus, application of the technique is limited.

A method of improving the quality of the surface of solid particles in powder-suspension systems and powder-solution systems includes a jet mill method utilizing fluid energy, in which mother particles cling to each other by fluid energy at potential core portions of jet streams. However, since separating child particles from mother particles is rather stronger than the operation of fixing child particles to mother particles on the average, effective fixation of child particles to mother particles is very difficult. There is an example of coating a solution to mother particles, in which because heat-isolated expansion of pressurized air is utilized as fluid energy, the cost of powder production is increased and the quality of products varies widely. Further, when a diameter of solid particles of which the quality of the surface is to be improved is relatively large (500 $\mu$m or more), a fluid coating method or rolling coating method is used. However, when the diameter of the particles is 100 $\mu$m or less, particles tend to be lumped due to the viscosity of the solution used for improving quality and it is impossible to improve the quality of surfaces of individual fine particles.

OBJECTS AND SUMMARY OF THE INVENTION

Accordingly, it is an object of the present invention to provide a method and an apparatus for improving the quality of the surface of solid particles in which the above problems in the prior art are removed.

It is another object of the present invention to provide a method of improving the quality of the surface of solid particles which includes fixing other material to the surface of the solid particles by using impact striking measures.

More particularly, as shown in FIG. 1, the present invention provides a method in which child particles are forcedly and firmly implanted or fixed on the whole surface of a mother particle by using mechanical means and if necessary using thermal means as auxiliary means so that the quality of the surface of the particle forming powder is improved to be uniform and stable in a very short time (several seconds to several minutes) and thereby functional composite material (hybrid powder) can be obtained. The gist of the present invention resides in the surface quality improvement method of solid particles characterized by fixing child particles to the surface of mother particles by implantation or fixation of child particles by using impact striking means (first embodiment).

Further, as shown in FIG. 6, the present invention provides a method in which child particles are forcedly implanted or fixed on the whole surface of a mother particle by mechanical means and if necessary using thermal means as auxiliary means and the whole or part of the child particles are melted to be fixed on the surface of the mother particle so that the quality of the surface of the particle forming powder is improved to be uniform and stable in a very short time (several seconds to several minutes) and thereby functional composite material (hybrid powder) can be obtained. The gist of the present invention resides in the surface quality improvement method of solid particles characterized by implanting or fixing child particles on the surface of mother particles by using impact striking measures and further softening and melting the whole or part of the child particles so that the child particles are fixed on the surface of the mother particles (second embodiment).

Further, as shown in FIG. 6, the present invention provides a method in which metal child particles are provided on part or the whole of the surface of a mother particle and the whole or part of the metal child particles are forcedly beaten to be fixed on the surface of the mother particle by using mechanical means and if necessary using thermal means as auxiliary means so that quality of the surface of the particle forming powder is improved to be uniform and stable in a very short time (several seconds to several minutes) and thereby functional composite material (hybrid powder) can be obtained. The gist of the present invention resides in the surface quality improvement method of solid particles characterized by beating out metal child particles on the surface of a mother particle by using impact striking measures so that the metal child particles are fixed on the surface of the mother particle (third embodiment).

As shown in FIG. 8, the present invention provides a method in which child particles or film forming material are forcedly implanted or fixed or films on part or the whole of surface of mother particle by using mechanical means and if necessary using thermal means as auxiliary means so that the quality of the surface of the particle forming powder is improved to be uniform and stable in a very short time (several seconds to several minutes) and thereby functional composite material (hybrid powder) can be obtained. The gist of the present invention resides in the surface quality improvement method of solid particles characterized by drying or cooling liquid on the surface of a solid particle to fix other fine solid particles contained in the liquid or film of material forming liquid on the surface of the solid particle (fourth embodiment).

Further, as shown in FIG. 12, the present invention provides a method in which a mother particle is covered with child particles by dry-type mechanical means and part of the mother particle is softened or melted or transformed to embed the child particles into the mother particle so that the quality of the surface of a particle forming powder is improved to be uniform and stable in a very short time (several seconds to several minutes) and thereby functional composite material (hybrid powder) can be obtained. The gist of the present invention resides in the surface quality improvement method of solid particles characterized by embedding other solid particles in cavities of the solid particle having surfaces formed in various uneven shapes or with holes and grooves and softening or melting or transforming the solid particle by using impact striking means so that the other solid particles are fixed in the solid particle by embedding the other solid particles into the solid particle (fifth embodiment).

In addition, the present invention provides an apparatus for implementing the above methods, and the gist thereof resides in a surface quality improvement apparatus of solid particles comprising an impact chamber including impact striking means, a supply inlet for feeding solid particles into the impact chamber and a circulating path which communicates from an outlet of the impact chamber to the supply inlet.

The present invention provides a surface quality improvement apparatus of solid particles further comprising, in addition to the above apparatus, a nozzle for feeding liquid into at least one of the impact chamber, the supply inlet and the circulating path, heating means and supply means for supplying inert gas.

BRIEF DESCRIPTION OF DRAWINGS

The present invention will become more fully understood from the detailed description given hereinbelow and the accompanying drawings which are given by way of illustration only, and wherein:

FIGS. 1(1) to (8) schematically illustrate various states of powder particles before and after improvement of the surface quality thereof by the method and apparatus according to the present invention;

DETAILED DESCRIPTION OF PREFERRED EMBODIMENTS

A first embodiment of the present invention will now be described.

Representative mother particles of which the surface can be processed by the method and the apparatus of the present invention generally have a diameter of about 0.1 μm to 100 μm and are formed of pigments such as titanium dioxide and iron oxide, synthetic high molecular material such as epoxy powder, nylon powder, polyethylene powder and polystyrene powder, and natural material such as starch, cellulose and silk powder. Representative child particles generally have a diameter of about 0.01 μm to 10 μm and are formed of natural material, synthetic material and various synthetic pigments such as silica colloid particles, alumina colloid particles, titanium dioxide powder, hydrozincite powder, iron oxide powder, mica powder, calcium carbonate powder and barium sulfate. However, both particles are not limited to the above materials and are applicable to combined components of various materials used in industries such as chemical industries, electrical industries, magnetic industries and various other industries dealing with cosmetics, paints, printing ink, toners, color material, fiber, medicine, foods, rubber, plastics, ceramics and the like.

There are generally used mother particles having a large diameter and a small hardness and child particles having a small diameter and a high hardness. However, the relationship of the diameter and hardness between mother particles and child particles is reversed depending on the combination of the largeness of particles. That is, softer child particles can be fixed to the surface of harder mother particles.

An embodiment of the present invention is now described in detail with reference to the drawings.

Figure 2:
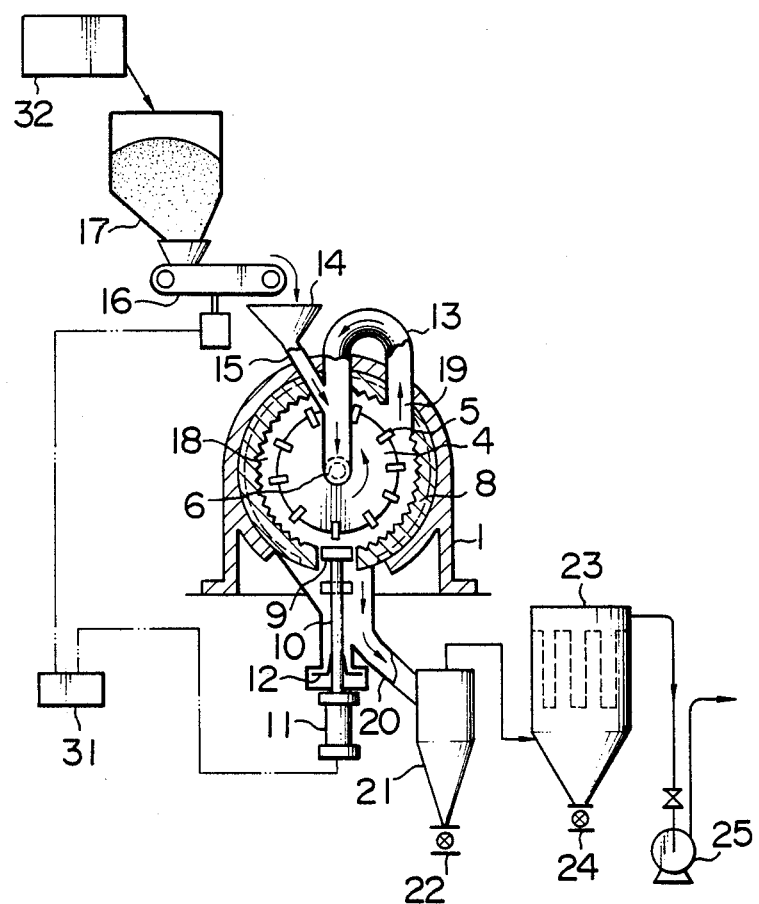
FIG. 2 schematically illustrates a powder impact apparatus according to an embodiment of the present invention together with peripheral equipment.

FIGS. 2 and, 3 show an, example of an impact striking means using a particle striking means. In the figures, 1 denotes a casing of a powder impactor (a representative impactor) used for implementing the method of the present invention, 2 a back cover thereof, 3 a front cover thereof, 4 a rotating plate provided in the casing 1 and which rotates at a high speed, 5 a plurality of impact pins disposed on the outer periphery of the rotating plate 4 radially at regular intervals and which are generally of a hammer type or a plate type, 6 a rotary shaft for supporting the rotating plate 4 in the casing 1 rotatably, 8 a collision ring disposed along an outermost peripheral orbital face of the impact pins 5 and facing the impact pins 5 while maintaining a constant space between the impact pins 5 and the ring 8 which uses various uneven shapes or a circumferential flat plate type, 9 an opening and closing valve provided in a notch formed at a portion of the collision ring 8 for exhausting powder for use to improve quality, 10 a shaft for the valve 9, 11 an actuator for operating the valve 9 through the shaft 10, 13 a circulating circuit having one opening formed at one end and coupled with a portion of the inner wall of the collision ring 8 and the other opening formed at the other end and coupled with a center of the rotating plate 4 to form a closed circuit, 14 a hopper for raw material, 15 a shoot coupling between the hopper 14 and the circulating circuit 13 for supplying raw material, 16 a metering feeder for raw material, 17 a reservoir for raw material, 18 a collision chamber provided between the outer periphery of the rotating plate 4 and the collision ring 8, 19 a circulating inlet to the circulating circuit 13, 20 a shoot for exhausting improved powder, 21 a cyclone, 22 a rotary valve, 23 a bag filter, 24 a rotary valve, 25 a wind exhausting device, 31 a time control device for controlling the operation of the apparatus of the present invention and 32 a known pre-processor such as a various mixers and an electric motor used when it is necessary to adhere child particles to the surface of mother particles previously.

The operation of the above apparatus is now described when the method of the present invention is implemented using this apparatus.

The valve 9 is closed and the rotary shaft 6 is driven by drive means (not shown) to rotate the rotating plate 4 at a peripheral speed of 5 m/sec to 160 m/sec depending on the nature of the material of which the surface quality is to be improved while introducing inert gas into the apparatus if necessary. At this time, rotation of the impact pins 5 disposed around the rotating plate 4 produces a sudden current of air and inert gas. A circulating air current, that is, a current of air of the perfect self-circulation type is formed from the circulating inlet 19 of the circulating circuit 13 which is formed in the impact chamber 18 through the circulating circuit 13 to the center of the rotating plate 4 by a fan effect based on the centrifugal force of the air current. Further, since air quality produced by circulation per unit time is extremely high as compared with the whole capacity of the impact chamber and the circulation system, very large circulation air current cycles are formed in a short time.

Then, powder to be processed which includes child particles adhered to surfaces of mother particles of a constant quality by utilizing, for example, electrostatic phenomenon is fed from the metering feeder 16 into the hopper 14 in a short time. When it is not necessary to use the pre-processor 32, mother particles and child particles are measured separately and are fed into the hopper 14. The powder to be processed enters from the hopper 14 through the shoot 15 to the impact chamber 18. The powder particles entering into the impact chamber 18 receive a momentary strike by many impact pins 5 provided on the plate 4 rotating at a high speed and further collide with the collision ring 8, so that child particles adhered on the surface of mother particles selectively receive strong compression. The powder to be processed enters into the circulating circuit 13 together with the current of the circulating gas and is returned to the impact chamber 18, so that the powder particles are struck again.

Such impact operation is continuously repeated many times in a short time. The child particles are embedded or strongly fixed in the surface of the mother particles. The series of impact operations, that is, the embedding or fixing operations of the child particles to the surface of the mother particles continue until the whole surface of the mother particles is settled uniformly and firmly. Since much gas (that is, air and inert gas) as compared with the total capacity of the impact chamber and the circulating system is circulated in the system, the powder to be processed (mother particles and child particles) which circulates together with gas receives a great number of impacts in a very short time. The time necessary to settle the surface of the particles is a very short time such as several seconds to several minutes generally even if including time for supplying the powder, although depending on a quality of the powder to be processed at one time.

FIGS. 1(1) and (2) illustrate a mother particle a to which only child particles b or both of child particles b and different child particles c are previously adhered by static electricity. When the particles are subjected to the fixing operation described above, the child particles b are embedded in the mother particle a or fixed to the mother particle a as shown in FIGS. 1(3) to (5) and the child particles b and c are fixed to the mother particle in the form of a single layer or plural layers by changing the order of supply of the child particles b and c, as shown in FIGS. 1(6) to (8).

After the completion of the above fixing operation, the valve 9 is moved to a position shown by the dashed line to open the valve 9 and the processed powder is exhausted. That is, the processed powder is exhausted from the impact chamber 18 and the circulating circuit 13 in a short time (several seconds) by centrifugal force (if the processed powder receives the centrifugal force, the valve 9 may be formed at another place) and the sucking force of the wind exhausting device 25 and is guided through the shoot 20 to a powder collecting device such as the cyclone 21 and the bag filter 23. The guided powder is collected thereto and exhausted outside through the rotary valves 22 and 24.

After the processed powder has been exhausted, the valve 9 is closed immediately. Then, a constant quality of powder to be processed is fed to the impact chamber through the metering feeder 16 again. The powder is subjected to the fixing operation in the same manner so that the processed powder is manufactured successively. The fixing operation of powder in one operation is continuously controlled by the time control device 31 in which the time required to process the powder has been established previously in relation to the operating time of associating devices.

When it is required to fix child particles to the surface of mother particles partially or locally, the powder impact apparatus of FIG. 2 can be used as a one pass type continuous processing system. In this case, the circulating inlet 19 is closed and the valve 9 is opened. Then, the powder to be processed may be fed from the hopper 15 continuously.

When it is required to use thermal treatment secondarily during the fixing operation (for example, when it is necessary to increase the difference in hardness between the mother particles and the child particles), the collision ring 8 and the circulating circuit 13 are formed in a jacket structure and a temperature condition suitable for the fixing operation of powder can be set by means of various heating agents and refrigerants.

In the powder impact apparatus of the present invention, auxiliary blades can be mounted to the rotating plate 4 or a centrifugal type plate fan, for example, can be disposed in the way of the circulating circuit 13 so that forced power can be added to circulating current. More particularly, if the air quality for circulation is increased, the number of times of circulation per unit time is increased. Accordingly, since the number of times of the collision of powder is also increased, the time required for the fixing operation can be reduced. Further, the method according to the present invention cannot only be implemented by the apparatus provided with the circulating circuit, but also by that having a structure in which the circulating circuit is removed in FIGS. 2 and 3.

Description is now made to a case where various inert gases such as nitrogen gas are used to prevent deterioration due to oxidation during the fixing operation of the powder and to prevent fires and explosions in the surface improving operation or the fixing operation of powder performed by the powder impact apparatus of the present invention.

Figure 4:
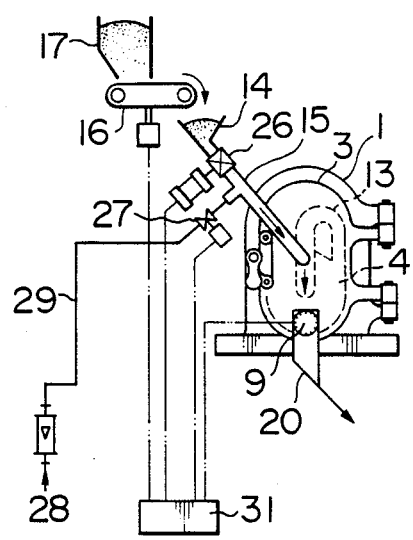
FIG. 4 schematically illustrates a powder impact apparatus according to another embodiment of the present invention when inert gas is used.

FIG. 4 shows an embodiment in which inert gas is used in the powder impact apparatus according to the present invention. In this embodiment, like elements to those of FIGS. 1 and 2 are designated by like reference numerals and a description thereof is omitted. In FIG. 4, numeral 26 denotes a valve disposed below the hopper 14 to feed raw material, numeral 27 denotes a valve coupled with an opening formed in the shoot 15 to supply inert gas, numeral 28 denotes an inert gas supply source, and numeral 29 denotes a path for supplying inert gas. In this embodiment, the circulating circuit 13 is provided within the casing 1.

At the beginning of the operation, the valve 26 for feeding raw material is closed and the valve 9 is opened. Then, the valve 27 for supplying inert gas is opened so that the impact chamber 18 and the circulating circuit 13 are filled with inert gas. The filling operation of the inert gas in the impact chamber and the circulating circuit prior to the fixing operation is generally terminated within a few minutes.

After the valves 9 and 27 are then closed simultaneously, the valve 26 is opened immediately so that previously measured powder is fed through the shoot 15 to the impact chamber 18. After the supply of powder, the valve 26 is closed immediately. In response to the closing of the valve 26, the metering feeder 16 measures powder for the next operation and supplies it to the hopper 14.

The powder is then subjected to the impact operation together with inert gas in the same manner as in the above embodiment of FIG. 2. The powder is settled while circulating in the circuit 1 and maintaining sufficient contact with the inert gas. The valves 9 and 27 are then opened and the processed powder is exhausted from the impact chamber 18 and the circulating circuit 13 to shoot 20. At the same time, the impact chamber 18 and the circulating circuit 13 are filled with new inert gas. The exhausted powder is processed in the same manner as in the embodiment of FIG. 2.

Then, when the valves 9 and 27 are closed and the valve 26 is opened, the subsequent fixing operation is started. The series of fixing operations including supply and stopping of inert gas is continuously controlled by the time controlled device 31 in the same manner as the embodiment of FIG. 2.

If child particles may be fixed to the surface of the mother particles partially, the powder impact apparatus of FIG. 4 can be used as a one pass type continuous processing system. In this case, the circulating circuit 13 of FIG. 4 is closed and the valves 26, 27 and 9 are opened. The powder to be processed may be fed from the hopper 14 continuously at a constant rate. At this time, if inert gas from the outlet of the wind exhausting device 25 of FIG. 2 is returned to the shoot 15, a quality of used inert gas can be reduced economically.

As described above, the surface quality improving method of solid (powder) particles nd the apparatus thereof according to the present invention are characterized by strong impact of the particle striking means forming the impact striking means to fine powder particles, utilization of the difference of hardness between mother particles and child particles, the magnitude of the impact given to the whole surface of mother particles having a fixed shape, and the number of times of impact which can be adjusted.

Further, as described above, according to the method and apparatus of the present invention, child particles are formed on the surface of the mother particle made of various materials in the form of a single layer made of a single component of child particles and made of two components and in the form of a plurality of layers made of one or more components of child particles.

According to the method and the apparatus of the present invention, if a ratio of fixed chile particles to each mother particle is not severe (that is, if the ratio of components as a whole may be constant), the preprocessor such as various mixers and an electric motor is not used and mother particle powder and chile particle powder measured separately are supplied to the impact chamber directly so that the fixing operation of child particles to the surface of mother particles can be made.

As described above, according to the surface quality improving method of solid particles and the apparatus thereof according to the present invention, the quality of the surface of mother particles composed of a combination of various powder materials is improved by embedding or firmly fixing child particles to the surface of mother particles and a functional composite and hybrid powder having uniform and stable characteristics can be produced effectively in a very short time.

The surface quality improving apparatus of solid particles according to the present invention includes the impact chamber and the circulating circuit having a very simple structure and when the front cover is opened, the rotating plate 4 can be removed to make disassembly easy. Accordingly, maintenance and cleaning in the apparatus can be performed very easily. The apparatus can avoid mixture of alien material upon change of a product and can be provided to improve the quality of the surface of powder material of a wide range.

Further, when inert gas is used, it is used efficiently and the quality of used inert gas can be minimized.

EXAMPLE 1

The powder impact apparatus of FIG. 2 including eight plate type impact pins mounted on the periphery of the rotating plate and having an outer diameter of 235 mm and the circulating circuit having a diameter of 54.9 mm was used. Child particles made of titanium dioxide having an average diameter of $dp50=0.3$ $\mu m$ were previously adhered to the surface of mother particles 12 made of spherical nylon having an average diameter of $dp50=5$ $\mu m$ by a mixer to make an ordered mixture which was fixed or settled under processing conditions shown in Table 1. Consequently, titanium dioxide (child particles) was embedded or firmly fixed to surface of nylon 12 (mother particles), and a uniform and stable powder of nylon 12 of which the quality of the surface was improved by titanium dioxide can be obtained.

Figure 5:
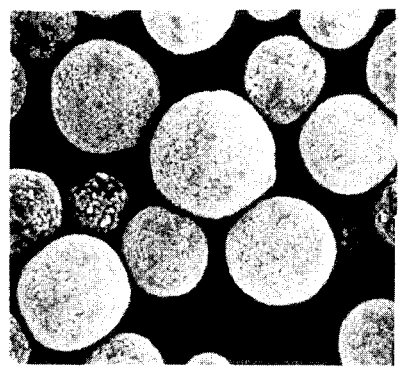
FIG. 5 shows photographs of a powder particle, of which the quality of the surface has been improved, taken by a scanning electron microscope and in which FIG. 5(1) shows the power particle 6000 times, 5(2) 20000 times and 5(3) 4000 times.
Figure 5:
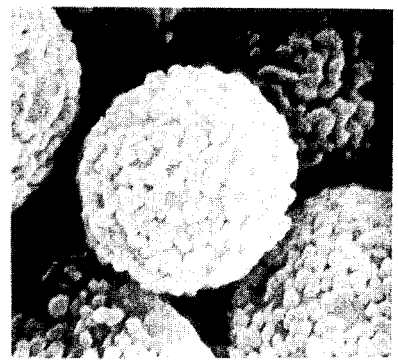
Figure 5:
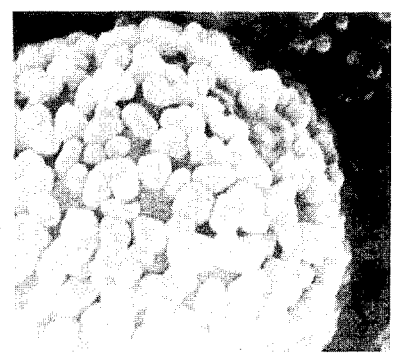

FIG. 5 shows photographs taken by a scanning electron microscope of the improved powder obtained by Example 1 (T-3 and T-4).

TABLE 1

Fixing condition of titanium dioxide to nylon 12 (sphere) forming a core

| | IMPLEMENTATION NO. | | | |
|---|---|---|---|---|
| | T-1 | T-2 | T-3 | T-4 |
| ROTATIONAL NO. OF ROTARY PLATE (r/m) | 9385 | 9385 | 9385 | 6540 |
| PIN PERIPHERAL SPEED (m/s) | 115.5 | 115.5 | 115.5 | 80.5 |
| CIRCULATING WIND QUANTITY ($m^3$/min) | 3.3 | 3.3 | 3.3 | 2.3 |
| NO. OF TIMES OF CIRCULATION | 1158 | 1158 | 3474 | 2418 |
| SUPPLY QUANTITY OF POWDER (g) | 70 | 35 | 35 | 35 |
| PROCESSING TIME (min) | 2 | 2 | 6 | 6 |
| TEMPERATURE OF POWDER (°C.) | 120 | 80 | 112 | 68 |
| DECISION OF QUALITY | good | good | good | good |

(Note) The above number of times of circulation was calculated from capacities of the impact chamber and the circulation circuit on the basis of the measured circulating wind quantity.

A second embodiment of the present invention is now described.

Representative mother particle powder uses various powders shown in the first embodiment. Generally, representative child particle powder has a diameter of about 0.01 $\mu m$ to 10 $\mu m$ and contains nylon powder, polyethylene powder, acryl powder, styrene powder, polypropylene powder, ABS powder, polyvinyl alcohol, gelatin, various wax, sulfur and organic substances, inorganic substances and metals such as alloys having low melting points. However, it is not limited to these materials in the same manner as the first embodiment. The combination of diameter and degree of hardness is the same as in the first embodiment.

Figure 3:
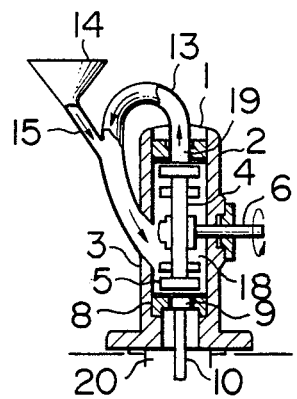
FIG. 3 is a side view of the apparatus of FIG. 2.

The impact striking means uses the same particle striking means as the first embodiment shown in FIGS. 2 to 4 and the operation is conducted in a similar manner.

The impact operation is continuously repeated many times in a short time, and child particles are embedded or firmly fixed to the surface of mother particles. Further, child particles receive thermal energy by the impact operation to soften and melt in a short time, so that the whole or part of the child particles fixed to the surface of one mother particle are melted and united to each other. The series of impact operations, that is, the softening, melting and fixing operations of child particles to the surface of mother particles are continued until the whole surface of the mother particle becomes a desired melted and united condition.

Figure 6:
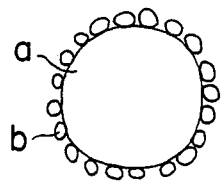
FIGS. 6(1) to (8) schematically illustrate various states of powder particles before and after the improvement of the surface quality thereof according to another embodiment of the present invention.
Figure 6:
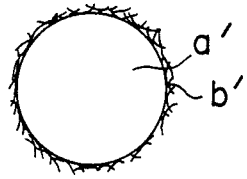
Figure 6:
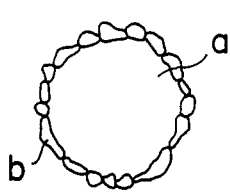
Figure 6:
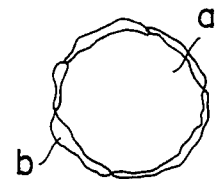
Figure 6:
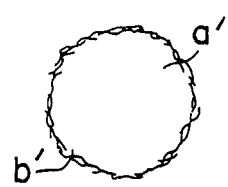
Figure 6:
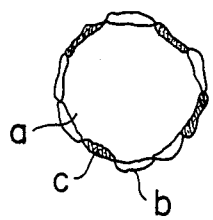
Figure 6:
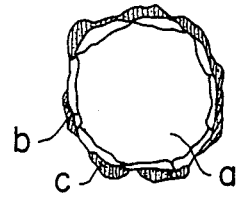
Figure 6:
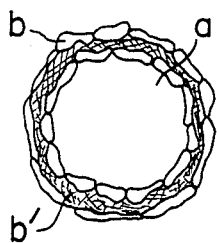

FIG. 6 shows models. In FIG. 6, mother particles and child particles are not limited to spheres. FIGS. 6(1) and (2) illustrate mother particle (a and a') to which child particles (b and b') are adhered previously by static electricity. The mother and child particles are subjected to the impact striking operation and the surface of child particles is softened and melted as shown in FIGS. 6(3) to (5). Union or combination between child particles is caused at a partial surface or over the whole surface of the mother particle so that child particles are settled to the surface of the mother particle. Further, as shown in FIGS. 6(6) to (8), child particles (b, c) different from each other are fixed to a mother particle in the form of a single layer or multiple layers depending on the combination of various child particles and the supply order of child particles.

As shown in FIG. 6, according to the method of the present invention, child particles are fixed to the surface of mother particles made of various materials in the form of a single particle layer composed of a single component of child particles or composed of two components of child particles, in the form of a microcapsule formed by covering mother particles in the form of film with child particles and a plurality of layers composed of one component or more of child particles. The child particles may be of any shape such as a sphere, an indeterminate form, a fiber shape and the like.

The surface of mother particles is not limited to a smooth surface and may be any shape having, for example, various sizes of uneven portions, holes or grooves.

If child particles may be fixed to a surface of a mother particle partially and locally, if thermal treatment is used secondarily, if inert gas is used, or the like, the fixing operation may be made in the same manner as the first embodiment.

EXAMPLE 2

The same apparatus as in Example 1 is used. The child particles of PMMA (polymethyl methacrylate) having an average diameter of dp50=0.3 μm are adhered to the surface of a mother particle of spherical nylon 12 having an average diameter of dp50=5 μm by a mixer previously to form an ordered mixture, which is subjected to a fixing operation including a softening and melting operation under processing conditions shown in Table 2. Consequently, child particles of polymethyl methacrylate are embedded in or firmly fixed to the surface of a mother particle forming a core of nylon 12, and part or all of the child particles soften and are melted, so that child particles are fixed to the surface of a mother particle. Thus, a powder of nylon 12 having the surface improved uniformly and stably by polymethyl methacrylate was obtained. Differences in softening and melting conditions for child particles depending on operating conditions are clearly shown (refer to photographs taken by a scanning electron microscope of FIG. 7). If a mother particle in the form of microcapsule is desired (refer to FIG. 7(2)), it can be obtained under the condition of T-11.

TABLE 2

Softening, melting and fixing condition of polymethyl methacrylate to nylon 12 (sphere) forming a core.

| | IMPLEMENTATION NO. | | |
| --- | --- | --- | --- |
| | T-11 | T-12 | T-13 |
| ROTATIONAL NO. OF ROTARY PLATE (r/m) | 9385 | 6540 | 6540 |
| PIN PERIPHERAL SPEED (m/s) | 115.5 | 80.5 | 80.5 |
| CIRCULATING WIND QUANTITY (m³/min) | 3.3 | 2.3 | 2.3 |
| NO. OF TIMES OF CIRCULATION | 1158 | 806 | 2418 |
| SUPPLY QUANTITY OF POWDER (g) | 35 | 35 | 35 |
| PROCESSING TIME (min) | 2 | 2 | 6 |
| TEMPERATURE OF POWDER (°C.) | 84 | 56 | 65 |
| DECISION OF QUALITY | melted wholly | melted partially | |

(Note) The above number of times of circulation was calculated from capacities of the impact chamber and the circulation circuit on the basis of the measured circulating wind quantity.

Figure 7:
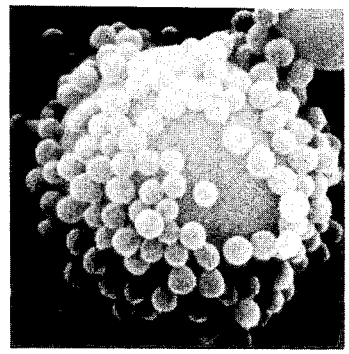
FIG. 7 shows photographs of a powder particle, of which the quality of the surface has been improved, taken by a scanning electron microscope and in which FIG. 7(1) shows electrostatic adhesion 10000 times, 7(2) 8500 times for implementation No. T-11, 7(3) 10000 times for implementation No. T-12 and 7(4) 10000 times for implementation No. T-13.
Figure 7:
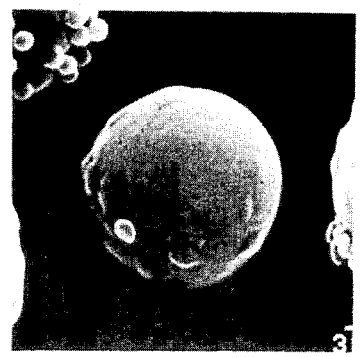
Figure 7:
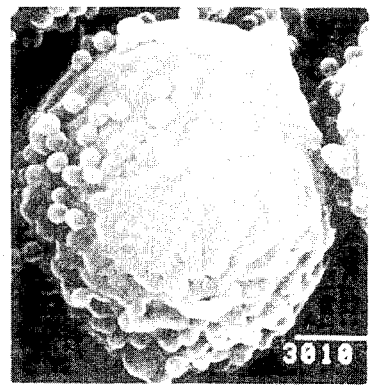
Figure 7:
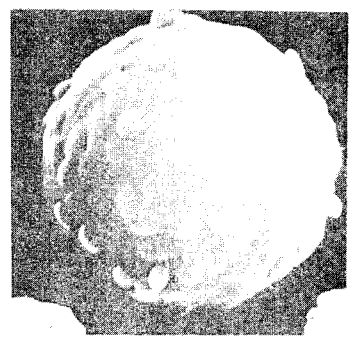

FIG. 7 shows photographs taken by a scanning electron microscope of an improved powder obtained by Example 2.

FIG. 7(1) shows child particles adhered to the surface of a mother particle, FIGS. 7(2), (3) and (4) show particles improved under conditions of the implementation Nos. T-11, T-12 and T-13, respectively.

A third embodiment of the present invention is now described.

Generally, a representative mother particle powder processed by the method of the present invention has a diameter of about 0.1 μm to 100 μm and contains inorganic substances such as calcium carbonate, kaolin, alumina, silica, glass bead and titanium dioxide, metal and metal compounds such as copper, lead, zinc, tin and iron, organic substance composite high molecular material such as epoxy powder, nylon powder, polyethylene powder and polystyrene powder, and organic substance natural material such as starch, cellulose and silk powder. Further, representative metal child particle powder (containing particles in the form of needle and thread) generally has a diameter of about 0.01 μm to 10 μm and contains fine particle powder formed of gold, silver, copper, zinc, tin, iron, lead, stainless steel, nickel, aluminum, titanium and cadmium, and powder oxide and compound powders thereof. However, both particles are not limited to the above materials and are applicable to combined components of various materials used in industries such as the chemical industry, the electrical industry, the magnetic industry and various other industries dealing with cosmetics, paints, printing ink, toners, color materials, fibers, medicine, foods, rubber, plastics, ceramics and the like.

There are generally used mother particles having a large diameter and child particles having a small diameter. However, the relationship of the diameter between mother particles and child particles is reversed depending on the combination of the largeness of the particles.

The impact striking means uses the same particle striking means as in the first embodiment shown in FIGS. 2 to 4 and a similar operation is conducted. Further, there is a case in which child particles are adhered to the surface of mother particles while using a small quality of water or material forming a binder such as various organic solvents.

The impact operation is continuously repeated many times in a short time so that metal child particles are strongly beaten out to the surface of mother particles. Further, the metal child particles are firmly fixed to the surface of mother particles in a short time by receiving thermal energy due to an impact operation. The series of impact operations, that is, the beating and fixing operations of metal child particles to the surface of mother particles is continued until the surface of the mother particles becomes a desired beaten and fixed condition locally or wholly. Since gas (containing air and inert gas) having a large quality as compared with all the capacity of the impact chamber and the circulating system is circulated in the system, particles (that is, mother particles and metal child particles) circulating in the system together with gas experience a very large number of impacts in a very short time. The time required for the beating and fixing operation is as short as several seconds to several minutes even if including the supply time of powder to be processed, although depending on the quality of the powder to be processed at one time.

Description is made using the figures of the second embodiment. As shown in FIGS. 6(1) and (2), metal particles (b, b') are adhered to mother particles with static electricity or a small quality of binder previously. The mother particles and child particles are subjected to the impact operation to beat out the surface of metal child particles as shown in FIG. 6(3) to (5) so that metal child particles are adhered or overlap each other partially or wholly and metal child particles are fixed to the surface of mother particles. Further, metal child particles (b, c) different from each other can be beaten and fixed to the surface of mother particles in a single layer and multiple layers depending on the combination of various metal child particles and the supply order thereof.

Further, if metal child particles may be fixed to the surface of mother particles partially and locally, if thermal treatment is used secondarily, if inert gas is used, or the like, the operation may be made in the same manner as the embodiment.

As described above, the method of beating and fixing metal particles to the surface of solid particles according to the present invention is characterized by the adjustability of the magnitude of impact and the number of times of impact given to metal particles adhered to the whole surface of the mother particle having a fixed shape under a condition in which fine powder particles are perfectly dispersed in air in the apparatus by utilizing the strong impact of the particle striking means forming the impact striking means to fine powder particles. Because proper impact can be given to individual fine powder particles simultaneously while preventing perfectly various fine powder particles having a diameter of the order of microns and a tendency to cohere with each other from being adhered to each other, the improved powder having a uniform quality and excellent color and brightness peculiar to metal can be produced in a short time.

As described above, according to the method of the present invention, metal child particles are beaten out and fixed to mother particles of various materials in a single layer made of a component of metal child particles or two or more components of metal child particles, in the form of microcapsules covering mother particles like film, and in plural layers made of one or more components of metal particles. The metal particles may be any shape such as spheres, indeterminate forms, fiber shapes and the like.

As described above, according to the method of the present invention, the metal child particles are beaten out and fixed to the mother particles made of a combination of various powder materials so that the quality of the surface of the mother particle is improved, and a functional composite or hybrid having uniform and stable characteristics can be produced effectively in a very short time.

EXAMPLE 3

The same apparatus as that used in Examples 1 and 2 is used.

Silver powder particles for conductive paint having an average diameter of dp50=0.5 $\mu$m to 3 $\mu$m are adhered to the surface of a mother particle made of spherical nylon 12 having an average diameter dp50=15 $\mu$m previously to form an ordered mixture, which has been beaten out and fixed under processing conditions shown in Table 3. Consequently, in any case, silver powder particles (metal chile particles) have been beaten out and fixed to the surface of mother particles of nylon 12 forming a core, and a uniform and stable surface quality improved powder of nylon 12 by silver powder for conductive paint was obtained.

TABLE 3

Extending and fixing condition of silver powder for conductive paint to nylon 12 (sphere) forming a core.

| | IMPLEMENTATION NO. | |
|---|---|---|
| | T-21 | T-22 |
| ROTATIONAL NO. OF ROTARY PLATE (r/m) | 9385 | 6540 |
| PIN PERIPHERAL SPEED (m/s) | 115.5 | 80.5 |
| CIRCULATING WIND QUANTITY (m³/min) | 3.3 | 2.3 |
| NO. OF TIMES OF CIRCULATION | 1158 | 806 |
| SUPPLY QUANTITY OF POWDER (g) | 50 | 50 |
| PROCESSING TIME (min) | 4 | 6 |
| TEMPERATURE OF POWDER (°C.) | 88 | 67 |
| DECISION OF QUALITY | good | good |

(Note) The above number of times of circulation was calculated from capacities of the impact chamber and the circulation circuit on the basis of the measured circulating wind quantity.

A fourth embodiment of the present invention is now described. Representative mother particle powder uses various powders described in the third embodiment. Further, representative child particle powder contains inorganic matter such as calcium carbonate, kaoline, alumina and titanium dixoide, metal and metal compounds such as copper, zinc, tin and iron, organic matter such as nylon, acryl, styrene and ABS in the form of a suspension, emulsion, sol and gel and having a diameter of about 0.001 $\mu$m to 10 $\mu$m. Melting material for forming a film contains wax, paraffin, rosin, various cellulose, oils and fats, gelatin, sugar, rubber, starch, starch inductor, silicon, titanium dioxide, copper, silver and various inorganic salts in the form of melted liquid. However, they are not limited to the above materials and are applicable to combined components of various materials used in industries such as the chemical industry, the electrical industry, the magnetic industry and various other industries dealing with cosmetics, paints, printing ink, toners, color materials, fibers, medicine, foods, rubber, plastics, ceramics and the like.

Figure 9:
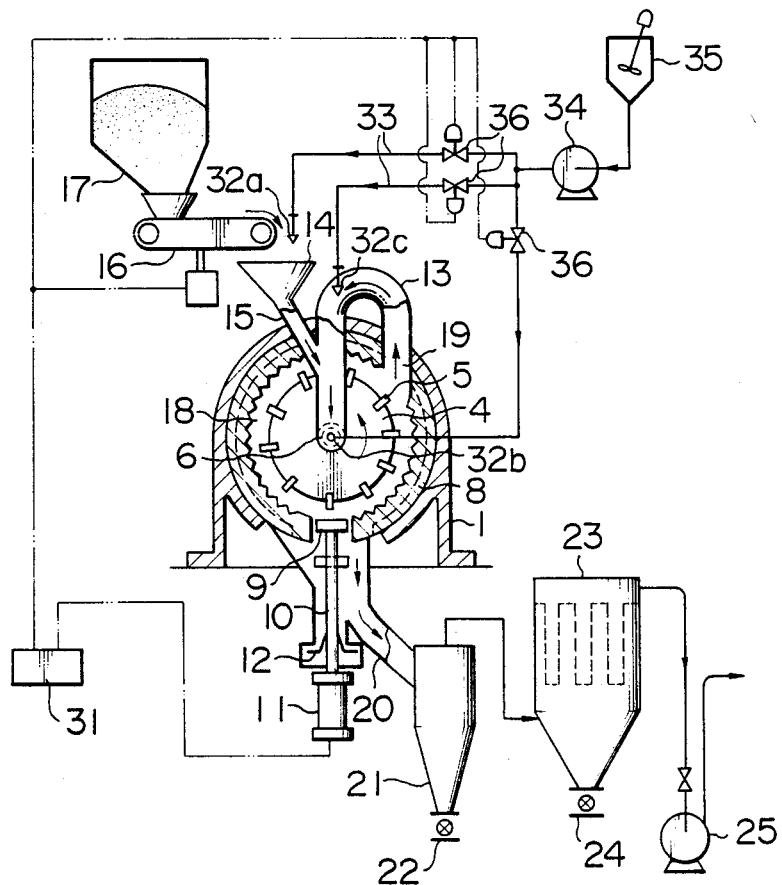
FIG. 9 schematically illustrates an embodiment of a powder impact apparatus used in the embodiment of FIG. 8 together with peripheral equipment.
Figure 10:
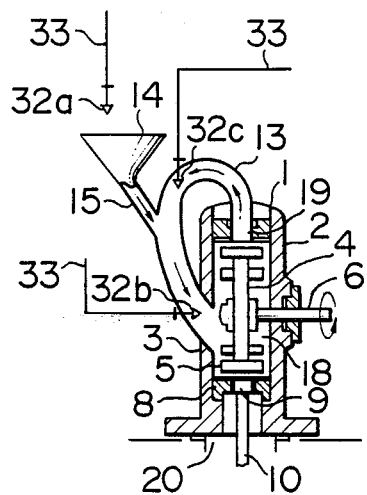
FIG. 10 is a side view of the apparatus of FIG. 9.

FIGS. 9 and 10 show a particle striking means used in the embodiment, in which numerals 32a, 32b and 32c denote, for example, spray nozzles for supplying liquid, that is, a suspension or solution to the surface of mother particles, numeral 33 denotes supply pipes of the liquid, numeral 34 denotes supply pumps of the liquid, numeral 35 denotes a reservoir of the liquid, numeral 36 denotes valves of the liquid which open and close automatically and manually. Other elements are the same as those of the apparatus shown in the above embodiment and are designated by like reference numerals.

Circulation cycles of air current are formed in the apparatus in the same manner as in the above embodiment.

A constant quality of powder to be processed, that is, mother particles are supplied to the hopper 14 from the metering feeder 16 in a short time. At the same time or after a constant time (generally, several seconds to several minutes) since the mother particles have been supplied to the hopper 14, a solution such as a suspension, emulsion, sol and gel containing small particles for the surface quality improvement or solution of material for surface quality improvement is supplied from the nozzles 32a, 32b and 32c. Whether the solution is supplied from a plurality of nozzles 32 or from one of nozzles 32 is determined depending on the combination of materials or others. The supply quality of the solution is set by, for example, the established pressure of the pump 34 and the opening and closing time of the automatic valve. The powder to be processed is supplied from the hopper 14 through the shoot 15 to impact chamber 18 and the solution supplied from the nozzles 32a, 32b and 32c is also supplied to the impact chamber 18. The powder particles and solution supplied to the impact chamber 18 receive a momentary striking operation by multiple impact pins 5 mounted on the rotating plate 4 which rotates at a high speed and collide against the collision ring 8 provided peripherally so that the surfaces of mother particles are compressed strongly. The powder is returned through the circulating circuit 13 to the impact chamber 18 again together with a current of the circulating gas, and struck again.

The impact operation is continuously repeated an appropriate number of times in a short time. Thus, the solution is uniformly adhered to the surface of mother particles and the adhered solution receives thermal energy caused by the impact operation. The solution containing child particles is dried in a short time and at the same time child particles left to the surface of mother particle are firmly adhered to the mother particles. In the similar process, solid matter in solution is also fixed to the surface of mother particles. A solution having a high temperature upon supply is reversely cooled and melted material forms a film on the surface of mother particles. The series of impact operations, that is, the fixing operation of child particles to the surface of mother particles or film forming operations of melted material are continued until the whole surface of the mother particle becomes the desired condition. Since a large quality of gas (air and inert gas) as compared with the whole capacity of the impact chamber and the circulating system is circulated in the system, powder to be processed (mother particles and child particles or film forming material) circulating together with gas receives a very large number of impacts in a very short time. Accordingly, even if fine powder having a diameter of the order of microns and the tendency of cohering to each other is adhered to the surface of mother particles together with the solution, particles are perfectly prevented from adhering and cohering to each other by the strong impact and very large number of times of impact and at the same time proper impact is given to individual fine particles. The operation terminates in a very short time in the same manner as the above embodiment.

Figure 8:
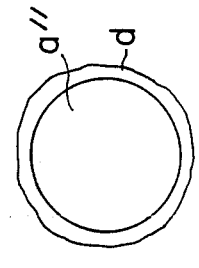
FIGS. 8(1) to (11) schematically illustrate various states of a powder particle before and after improvement of the surface quality thereof according to still another embodiment of the present invention.
Figure 8:
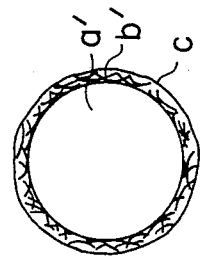
Figure 8:
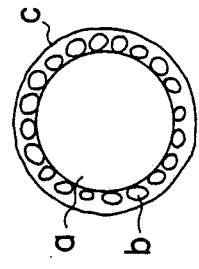
Figure 8:
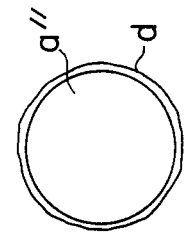
Figure 8:
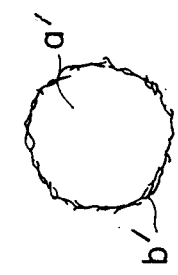
Figure 8:
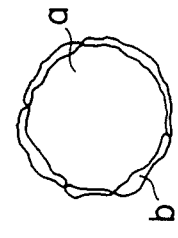
Figure 8:
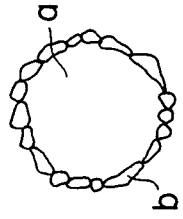
Figure 8:
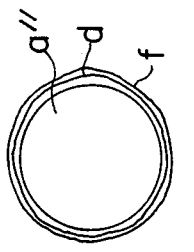
Figure 8:
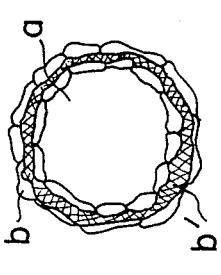
Figure 8:
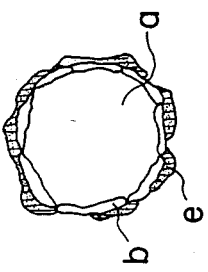
Figure 8:
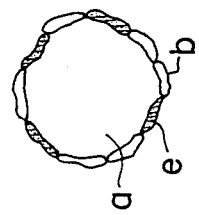

FIG. 8 shows models. In FIG. 8, mother particles and child particles are not limited to spheres. FIGS. 8(1) and (2) illustrate mother particles (a, a') with child particles (b, b') adhering to the mother particles together with various solutions (c), and FIG. 8(3) illustrates mother particles (a") to which solution (d) of various materials adheres. The mother particles, child particles and solutions are subjected to the impact operation. Thus, as shown in FIGS. 8(4) to (7), the solution (c) containing child particles is dried and the solution is dried or cooled so that at the same time child particles or film are firmly fixed to the surface of mother particles. The child particles (b, e) different from each other are fixed to the surface of the mother particles (a) in single and multiple layers and multiple layers of films (d, f) can be fixed to the surface of mother particles (a") depending on the combination of various child particles and the supply order as shown in Figs. B(8) to (11).

Other operations may be performed in the same manner as the above embodiments.

If child particles are fixed to the surface of mother particles partially and locally and if thermal treatment is used secondarily, the operation is conducted in the same manner as the above embodiment.

Description is now made to a case in which various inert gases such as nitrogen gas are used to prevent deterioration due to oxidation during the fixing operation of the powder and to prevent fire and explosions in the surface improving operation of powder performed by the powder impact apparatus of the present invention.

Figure 11:
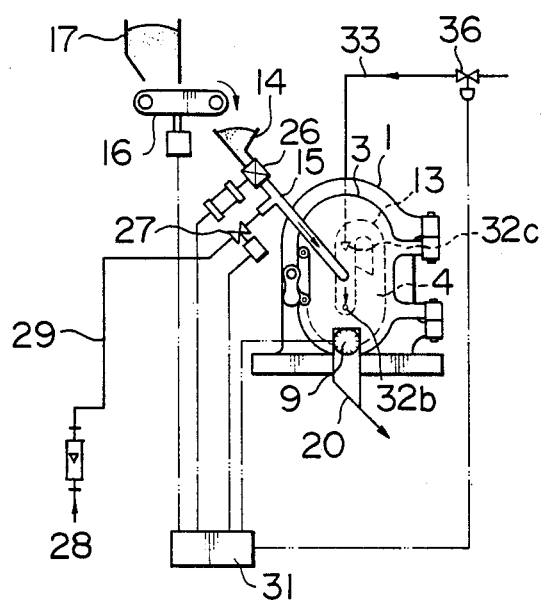
FIG. 11 schematically illustrates a powder impact apparatus according to another embodiment of the present invention when inert gas is used.

FIG. 11 shows an embodiment of the powder impactor according to the present invention in which inert gas is used. Like elements to those of the above embodiment are designated with like reference numerals and a description thereof is omitted.

At the beginning of the operation, the valve 26 for feeding raw material is closed and the valve 9 is opened. Then, the valve 27 for supplying inert gas is opened so that the impact chamber 18 and the circulating circuit 13 are filled with inert gas. The filling operation of inert gas in the impact chamber and the circulating circuit prior to the fixing operation is generally terminated within a few minutes.

After the valves 9 and 27 are closed simultaneously, the valve 26 is opened immediately so that previously measured powder is fed through the shoot 15 to the impact chamber 18. At the same time or after a constant time, liquid is supplied from the nozzles 32b and 32c. After the supply of powder, the valve 26 is closed immediately. In response to the closure of the valve 26, the metering feeder 16 measures powder for the next operation and supplies it to the hopper 14.

The powder is then subjected to the impact operation together with inert gas in the same manner as in the above embodiments and is processed in the same manner as in the above embodiments. The resultant effects are substantially identical.

In the method of the present invention, because proper impact can be given to individual fine powder while preventing various fine powder having a diameter of microns and the tendency of cohering to each other from adhering to each other, functional improved powder having a uniform quality can be produced in short time.

As shown in FIG. 8, according to the method of the present invention, child particles or film forming materials are fixed to the surface of mother particles of various materials in a single layer made of one component or two or more components of child particles, in the form of microcapsules in which mother particles are covered with film, and in plural layers made of one or more components of child particles or film forming material.

As described above, according to the surface quality method of solid particles and the apparatus thereof according to the present invention, child particles or film forming material are firmly fixed to mother particles composed of a combination of various powder material and liquid so that the quality of the surface of mother particles is improved, and a functional composite or hybrid powder having uniform and stable characteristic can be produced effectively in a very short time.

EXAMPLE 4

A powder impactor of FIG. 9 including eight plate type impact pins mounted in the periphery of the rotating plate and having an outer diameter of 235 mm and circulating circuit having a diameter of 54.9 mm is used. Child particles made of titanium dioxide having an average diameter of dp50=0.3 $\mu$m and contained in a suspension formed by suspending titanium dioxide in water having a quality of 1.2 times titanium dioxide in weight ratio are fixed to the surface of mother particles of spheric nylon 12 having an average diameter of dp50=5 $\mu$m. Under the fixing condition of a rotational number of the plate = 9385 r/m, outer peripheral speed of plate type impact pins = 115.5 m/s, circulating wind quality = 3.3 m$^3$/min, number of times of circulation = 2895 times and processing time = 5 min, powder having a supply quality of 35g and suspension having a supply quality of 19 g are supplied intermittently in four minutes at the beginning and are subjected to the fixing operation. Consequently, titanium dioxide of child particles is embedded and fixed to the surface of nylon 12 of mother particles. Thus, as shown in FIG. 8(4), the surface quality improved powder by titanium dioxide of nylon 12 having uniform and stable characteristics was obtained. Further, water contained in the obtained surface quality improved powder was measured (at a temperature of improved powder of 79° C.) and it was understood that it was in a substantially dry state.

EXAMPLE 5

The powder impactor of FIG. 9 including twelve plate type impact pins mounted in the periphery of the rotating plate and having an outer diameter of 235 mm and circulating circuit having a diameter of 54.9 mm is used. In order to make a film of wax melted at a temperature of 80° C. on the surface of mother particles made of the starch of a potato and having an average diameter of 60-80 $\mu$m, the improving operation was effected under the following filming conditions: a rotational number of rotating plate = 6540 r/m, an outer peripheral speed of plate type impact pin = 80.5 m/s, circulating wind quality = 2.3 m$^3$/min, circulating number of times = 1209 times and processing time = 3 min, powder (starch) having a supply quality of 40g and melted wax having a supply quality of 10g were supplied continuously in two minutes at the beginning and a film forming operation was conducted. Consequently, cooled wax is formed in a film over the whole surface of starch particles and microcapsules formed of a wax of starch particles having uniform and stable characteristics were obtained as shown in FIG. 8(7).

In the improving operation, the outer wall of the impact chamber and the circulating pipe was formed in a jacket structure to reduce the temperature of circulating air to 65° C. or less and cooling water having a temperature of 14° C. was used as a refrigerant. Consequently, the temperature of obtained improved powder was 54° C.

A fifth embodiment of the present invention is now described.

Representative mother particle powder of which the surface can be processed by the method of the present invention has a diameter of about 0.1 $\mu$m to 100 $\mu$m and a surface formed in various shapes with uneven portions, holes and grooves and is formed of organic matter, inorganic matter and metal such as nylon powder polyethylene powder, acryl powder, styrene powder, ABS powder, polypropylene powder, gelatin, various waxes, sulfur, copper powder and silver powder. Representative chile particle powder has a diameter of about 0.01 $\mu$m to 10 $\mu$m and is formed of pigments such as titanium dioxide, carbon and iron oxide, high molecular material such as epoxy powder, nylon powder and acryl powder, metals such as tin, silver and copper, natural materials such as starch, cellulose, silk powder and ceramics and various powder perfumes. However, the present invention is not limited to the above materials and is applicable to combined components of various materials used in industries such as the chemical industry, the electrical industry, the magnetic industry and various other industries dealing with cosmetics, paints, printing ink, toners, color materials, fibers, medicine, foods, rubber, plastics, ceramics and the like.

The same particle striking means as that of the above embodiment shown in FIGS. 2 to 4 is employed as an impact striking means and the operation is performed in the same manner.

The impact operation is continuously repeated an appropriate number of times in a short time. The surface of mother particles, particularly projections of mother particles, receive thermal energy caused by the impact operation so that projections are softened, melted and transformed and child particles are embedded in mother particles. Thus, a film of mother particles is formed on the surface of the mother surface. The series of impact operations is continued until the whole surface of mother particles becomes the desired melted state. The time required to improve the quality of the surface is generally a very short time of several seconds to several minutes even if including the supply time of powder in the same manner as in the above embodiments.

Figure 12:
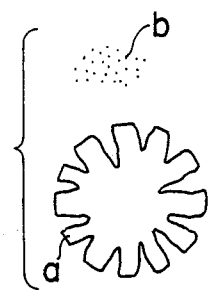
FIG. 12(1) to (4) schematically illustrate various states of a powder particle before and after the improvement of the surface quality thereof according to a still another embodiment of the present invention.
Figure 12:
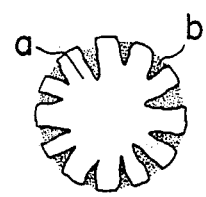
Figure 12:
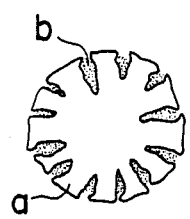
Figure 12:
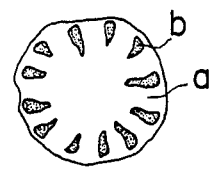

FIG. 12 depicts models. In FIG. 12, a represents a mother particle having a surface formed in various shapes of uneven portions or with holes and grooves and b represents child particles. FIG. 12(1) shows mother particles and child particles both being not adhered to each other, and FIG. 12(2) shows mother particles with child particles being adhered to the mother particle. When the mother particle with child particles adhered is subjected to the impact operation, portions, that is, projections of the mother particle are softened, melted or transformed and child particles are embedded into mother particles as shown in FIGS. 1(3) and (4). The embedded child particles are not limited to a single component of child particles but can contain two or more components of child particles. The subsequent operation is the same as that of the above embodiment.

If child particles may be fixed to the surface of mother particles partially and locally, if thermal treatment is used secondarily, if inert gas is used, or the like, the same operation as in the first to third embodiments may be made.

As described above, the surface quality improving method of solid particle powder according to the present invention is characterized by strong impact of the particle striking means forming impact striking means to fine powder particles and embedment of child particles into mother particles by utilization of impact in view of the surface shape of the mother particle.

EXAMPLE 6

The powder impactor of FIG. 2 including eight-plate-type impact pins mounted in the periphery of the rotating plate and having an outer diameter of 235 mm and the circulating circuit having a diameter of 54.9 mm was employed. Child particles of acetylene black having an average diameter of dp50=0.03 $\mu$m were mixed and adhered to mother particles of porous nylon 6 having an average diameter of dp50=19 $\mu$m by a mixer. The particles adhered to each other were processed by the processing apparatus under the conditions of rotational number of 6540 rpm, powder supply quality of 120 g and operating time of 2 minutes. Surface quality improved powder in which embedded acetylene black (child particles) into nylon particles (mother particles) is further covered over the surface thereof with nylon 6 was obtained.

Figure 13:
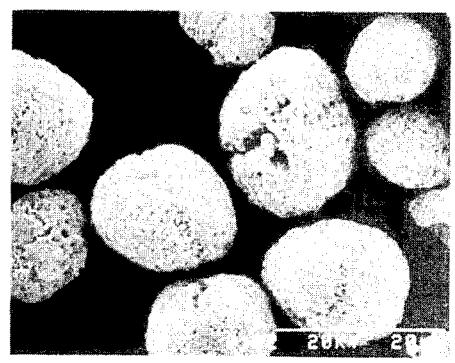
FIG. 13 shows photographs of a powder sample used in the embodiment of FIG. 12 and taken by a scanning electron microscope, and in which FIG. 13(1) shows porous nylon material (2000 times), 3(2) mother particles with child particles adhered thereto (5000 times) and 13(3) mother particles of which the surface has been improved by impact striking means and in which child particles are embedded therein (5000 times)
Figure 13:
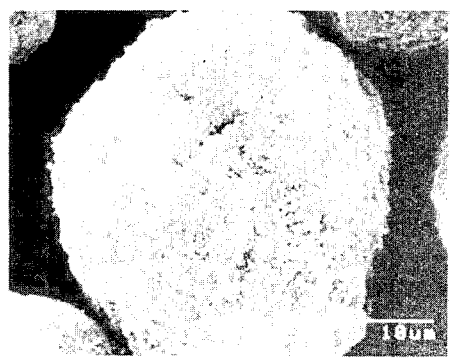
Figure 13:

FIG. 13 shows photographs taken by a scanning electron microscope of a powder sample used in the embodiment, in which FIG. 13(1) shows porous mother particles, FIG. 13(2) shows mother particles with child particles adhering to the mother particles, and FIG. 13(3) shows mother particles in which child particles are embedded.

As described above, according to the surface quality improving method of solid particles according to the present invention, the surface quality improving operation in which child particles are embedded into mother particles composed of a combination of various powder materials by utilizing the shape of the surface of mother particles is performed so that a functional composite or hybrid powder having uniform and stable characteristics can be obtained efficiently in a very short time.

The method of spheroidizing solid particles by the apparatus of the present invention is now described.

Heretofore, the spheroidizing operation of fine powder is conducted to prevent lumping of solid particles and to improve dispersion and fluidity. The operation has been conducted by putting material into an agitator of various mixer types and ball mill types to agitate the material for a long time (generally, several hours) and by exerting friction force and compression force caused by agitation.

However, it takes several hours to obtain the desired spherical particles and accordingly the apparatus is large. Furthermore, the friction force and compression force caused by agitation are effected to fine particles having different diameters uniformly. Accordingly, most of the particles to be spheroidized are broken or are formed in flat, and the quality and working efficiency are deteriorated.

Figure 14:
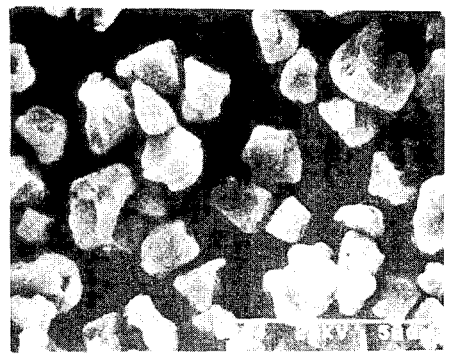
FIG. 14 shows photographs of powder particles taken by a scanning electron microscope before and after they are processed to spheres according to yet another embodiment of the present invention, and in which FIGS. 14(1) and (2) show powder particles 1000 times.
Figure 14:
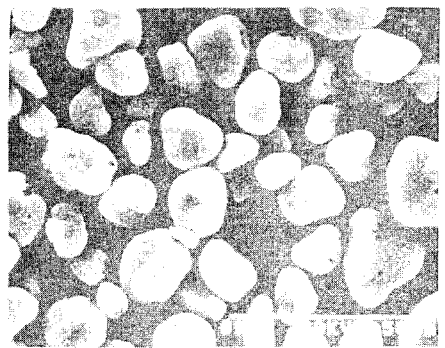

The embodiment provides a method in which fine solid particles having different diameters and shapes as shown by a photograph (1) of FIG. 14 can be made to spherical particles having uniform roundness as shown by a photograph (2) of FIG. 14 by using mechanical impact means and if necessary using thermal means as auxiliary means in a very short time. The gist thereof resides in the method of spheroidizing indeterminate fine solid particles (powder) by using impact striking means.

Representative powder to be spheroidized has a diameter of about 0.1 $\mu$m to 100 $\mu$m and is formed of organic matter such as epoxy powder, nylon powder, polyethylene powder, polystyrene powder, cellulose and silk powder, inorganic matter and metal such as titanium oxide, graphite, zinc powder, nickel, copper, lead and iron. However, the powder is not limited to the above materials and is applicable to combined components of various materials used in industries such as the chemical industry, the electrical industry, the magnetic industry and various other industries dealing with cosmetics, paints, printing ink, toners, color materials, fibers, medicine, foods, rubber, plastics, ceramics and the like.

As described in the above embodiments, when the core is formed by various materials and fine particles having characteristics different from that of the core particle are fixed to the surface of the core particle or are formed in a film on the surface of the core particle, that is, when the surface quality improving operation is made, if the core material has an indeterminate shape (generally, the diameter thereof is not uniform), the spheroidizing operation can be made at the same time as the surface quality improving operation.

With the apparatus, raw material to be spheroidized is supplied to the hopper 14 and the same operation as the above embodiments is conducted.

The impact operation is continuously repeated an appropriate number of times in a short time and an indeterminate number of powder particles are spheroidized. The series of impact operations, that is, the spheroidizing operation is continued until the whole surface of the fine powder particles becomes a uniform sphere or substantially round. The spheroidizing operation is terminated in a very short time in the same manner as the other embodiments.

If the particles are spheroidized partially and locally, if thermal treatment is used secondarily, if inert gas is used, or the like, the same operation as the above embodiments may be conducted.

EXAMPLE 7

The same powder impactor as that of the Example 6 was used. Indeterminate styrene resin powder particles (FIG. 14(1)) having an average diameter of dp50=15 $\mu$m are spheroidized under the processing conditions shown in Table 4. Consequently, spherical powder particles having a uniform roundness as shown in FIG. 14(2) were obtained.

TABLE 4

Spheroidizing conditions of indeterminate styrene resin powder

| | IMPLEMENTATION NO. | | |
|---|---|---|---|
| | T-31 | T-32 | T-33 |
| ROTATIONAL NO. OF ROTARY PLATE (r/m) | 9385 | 9385 | 6540 |
| PIN PERIPHERAL SPEED (m/s) (m/s) | 115.5 | 115.5 | 80.5 |
| CIRCULATING WIND QUANTITY (m³/min) | 3.3 | 3.3 | 2.3 |
| NO. OF TIMES OF CIRCULATION | 1158 | 1158 | 2418 |
| SUPPLY QUANTITY OF POWDER (g) | 100 | 65 | 100 |
| PROCESSING TIME (min) | 2 | 2 | 6 |
| TEMPERATURE OF POWDER (°C.) | 70 | 62 | 68 |
| DECISION OF QUALITY | good | good | good |

(Note) The above number of times of circulation was measured from capacities of the impact chamber and the circulation circuit on the basis of the measured circulating wind quantity.

FIG. 14 shows photographs taken by a scanning electron microscope of powder particles before and after spheroidization under the conditions of Example 7 (T-33).

As described above, according to the present invention, the magnitude of impact and the number of times thereof for providing impact to the whole surface of powder particles having different diameters and shapes in the state where fine powder particles are dispersed perfectly in air of the system by utilizing strong impact of the particle striking means forming impact striking means to the fine particles can be adjusted properly.

Accordingly, since proper impact can be given to individual fine powder particles while preventing various fine powder particles having a diameter of the order of microns and the tendency of cohering to each other from adhering to each other, spherical particles having a uniform roundness can be produced efficiently in a short time.

What is claimed is:

1. An apparatus for improving the surface quality of solid particles which comprises
   a collision chamber,
   at least one inlet means for introducing solid particles into said collision chamber,
   a collision surface disposed within said collision chamber,
   a rotating plate rotatably disposed within said collision chamber, said rotating plate being provided with a plurality of impact pins which extend from the surface thereof,
   means for rotating the rotating plate at a high peripheral speed, thereby generating a strong circulating gas stream within said collision chamber as well as impact pins with a high impact surface,
   a self-circulating circuit means provided for conducting and circulating at least a portion of the circulating gas stream generated in said collision chamber due to the rotation of said rotating plate, said self-circulating conduit communicating with said collision chamber for both removing the gas stream containing said solid particles from said collision chamber and returning it to said collision chamber so that said solid particles can repeatedly receive the impact action created by the impact pins, the collision surface and the speed of the circulating gas stream, and
   means for removing solid particles having an improved surface quality from the collision chamber.

2. The apparatus for improving the surface quality of solid particles of claim 1, wherein the rotating plate is rotated at a peripheral speed of 5 to 160 m/sec.

3. The apparatus for improving the surface quality of solid particles of claim 1, wherein the collision surface is a collision ring provided along the inside surface of the collision chamber, said collision ring having a jagged surface which faces the impact pins.

4. The apparatus for improving the surface quality of solid particles of claim 3, wherein the self-circulating circuit communicates with the collision chamber at the collision ring and in the proximity of the center of the rotating plate.

5. The apparatus for improving the surface quality of solid particles of claim 1, wherein the means for removing the solid particles from the collision chamber is an opening and closing valve operatively associated with conduit means.

6. The apparatus for improving the surface quality of solid particles of claim 3, wherein the collision chamber is provided between the outer periphery of the rotating plate and the collision ring.

7. The apparatus for improving the surface quality of solid particles of claim 5, wherein an exhaust pump communicates the conduit means.

8. The apparatus for improving the surface quality of solid particles of claim 1, wherein a time control device is operatively connected with the inlet means and means for removing said solid particles from the collision chamber.

9. The apparatus for improving the surface quality of solid particles of claim 1, wherein means are provided for introducing a supplemental gas into the collision chamber.

10. The apparatus for improving the surface quality of solid particles of claim 1, wherein the inlet means includes a plurality of inlet means for introducing solid particles or solid particles suspended in a fluid medium into the collision chamber and/or into the self-circulating circuit means.

11. The apparatus for improving the surface quality of solid particles of claim 1, wherein heating means are operatively associated with the collision chamber and/or the self-circulating circuit means.

12. A method for improving the surface quality of solid particles by impacting the surface of said solid particles with fine particles smaller in size than said solid particles, utilizing a collision chamber and a rotating plate having a plurality of impact pins extending from the surface thereof, said rotating plate being rotatably disposed within said collision chamber, which comprises
   introducing said solid particles and fine smaller particles into said collision chamber,
   rotating the rotating plate at a peripheral speed of 5 to 160 m/sec to create a high speed gas flow within said collision chamber, said gas flow serving to conduct and circulate said solid particles and fine smaller particles within said collision chamber to form a circulating cycle of enormous speed and circulation frequency whereby the smaller fine particles are caused to impact upon and be fixed to the surface of the solid particles thereby improving the surface quality of the solid particles.

13. The method for improving the surface quality of solid particles of claim 12, wherein a collision ring is provided on the walls of the collision chamber and a self-circulating circuit conducts and circulates at least a portion of the circulating gas stream containing the solid particles and smaller fine particles from the collision chamber at the vicinity of the collision ring and returns the gas stream to the collision chamber in the vicinity of the center of the rotating plate, thereby forming a circulating cycle of enormous frequency whereby the impact power generated by the impact pins, the collision ring and the circulation frequency causes the smaller fine particles to be embedded into the surface of the solid particles thereby improving the surface quality of the solid particles.

14. The method for improving the surface quality of solid particles of claim 13, wherein thermal energy is generated by the impact power produced by the rotating plate.

15. The method for improving the surface quality of solid particles of claim 14, wherein the smaller fine particles and the solid particles are melted together by auxiliary heat.

16. The method for improving the surface quality of solid particles of claim 15, wherein the smaller fine particles are solid particles smaller in size than said solid particles.

17. The method for improving the surface quality of solid particles of claim 12, wherein the smaller fine particles are forcibly beaten to be fixed to the surface of the solid particles.

18. The method for improving the surface quality of solid particles of claim 12, wherein the smaller fine particles are preliminarily adhered to the surface of the solid particles.

19. The method for improving the surface quality of solid particles of claim 12, wherein drying or cooling liquid is provided on the surface of the solid particles to which the smaller fine particles are preliminarily fixed.

20. The method for improving the surface quality of solid particles of claim 12, wherein the impact force is applied to dry or cool liquid to fix a film of the smaller fine particles contained in the liquid to the surface of the solid particles, said liquid being supplied to the collision chamber while the impact force is applied to the small fine particles by solid particles so that said liquid is adhered thereto.

21. The method for improving the surface quality of solid particles of claim 12, wherein the solid particles have a diameter of about 0.1 $\mu$m to 100 $\mu$m.

22. The method for improving the surface quality of solid particles of claim 12, wherein the smaller fine particle is titanium dioxide.

23. The method for improving the surface quality of solid particles of claim 12, wherein the smaller fine particles are fixed to the surface of the solid particles by softening and melting said smaller fine particles by using the impact striking force.

24. The method for improving the surface quality of solid particles of claim 12, wherein the solid particles have surfaces formed with cavities and uneven shapes, holes or grooves and said impact striking force is employed to soften, melt and transform the solid particles so that the smaller fine particles are fixed therein.

25. The method for improving the surface quality of solid particles of claim 12, wherein an inert gas is additionally introduced into the collision chamber.

26. The method for improving the surface quality of solid particles of claim 12, wherein the smaller fine particles have a diameter of about 0.01 $\mu$m to 10 $\mu$m.

27. The method for improving the surface quality of solid particles of claim 12, wherein the solid particle is nylon 12 having an average diameter of dp 50 = 5 $\mu$m and the smaller vine particle is titanium dioxide having an average diameter of dp 50 = 0.3 $\mu$m.

28. The method for improving the surface quality of solid particles of claim 12, wherein the treatment time is from several seconds to several minutes and the solid particles have an average particle size of 0.1 $\mu$m.

* * * * *